US012552286B2

United States Patent
Salter et al.

(10) Patent No.: US 12,552,286 B2
(45) Date of Patent: Feb. 17, 2026

(54) ELECTRIC VEHICLE HAVING MOMENTARY PUSH BUTTON BATTERY SWITCH

(71) Applicant: Ford Global Technologies, LLC, Dearborn, MI (US)

(72) Inventors: Stuart C. Salter, White Lake, MI (US); Jeff Robert Seaman, Petersburg, MI (US); Rudi Todd Ansbacher, Westland, MI (US); David Celinske, Wolverine Lake, MI (US); Samuel Sesena, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 18/590,666

(22) Filed: Feb. 28, 2024

(65) Prior Publication Data

US 2025/0269763 A1  Aug. 28, 2025

(51) Int. Cl.
| | |
|---|---|
| *B60L 50/60* | (2019.01) |
| *B60L 53/16* | (2019.01) |
| *B60L 58/12* | (2019.01) |
| *H01M 50/204* | (2021.01) |
| *E05B 81/56* | (2014.01) |

(52) U.S. Cl.
CPC ............... *B60L 58/12* (2019.02); *B60L 50/60* (2019.02); *B60L 53/16* (2019.02); *H01M 50/204* (2021.01); *E05B 81/56* (2013.01); *H01M 2220/20* (2013.01)

(58) Field of Classification Search
CPC .......... B60L 58/12; B60L 50/60; B60L 53/16; H01M 50/204; H01M 2220/20; E05B 81/56
See application file for complete search history.

(56) References Cited

U.S. PATENT DOCUMENTS

| | | | |
|---|---|---|---|
| 8,054,039 B2 | 11/2011 | Bauerle et al. | |
| 10,286,800 B2 | 5/2019 | DeDona et al. | |
| 10,780,790 B1 * | 9/2020 | Presna | B60L 50/66 |
| 11,338,697 B2 * | 5/2022 | Ichikawa | B60L 1/003 |

(Continued)

FOREIGN PATENT DOCUMENTS

| | | | |
|---|---|---|---|
| EP | 2228882 A2 | | 9/2010 |
| JP | 2022181503 A | * | 12/2022 |
| WO | 2011127446 A2 | | 10/2011 |

OTHER PUBLICATIONS

New Eagle, Mechatronic Control Solutions, Electric Vehicle Supervisor System, Jul. 3, 2012.

(Continued)

*Primary Examiner* — Elim Ortiz
(74) *Attorney, Agent, or Firm* — Frank Lollo; Price Heneveld LLP

(57) ABSTRACT

An electric powered vehicle having an electric powered motor, a high voltage primary battery pack configured to power the electric motor, a low voltage secondary battery configured to power one or more control modules, and a push button switch electrically coupled between the low voltage secondary battery and one or more control modules. The secondary battery is controlled to reserve battery energy, and the push button switch is actuatable to allow the one or more control modules to be powered by the secondary battery.

19 Claims, 3 Drawing Sheets

(56) References Cited

U.S. PATENT DOCUMENTS

| | | |
|---|---|---|
| 2009/0306841 A1 | 12/2009 | Miwa et al. |
| 2010/0213896 A1 | 8/2010 | Ishii et al. |
| 2010/0270860 A1 | 10/2010 | Kamaga |
| 2011/0101915 A1 | 5/2011 | Mitsutani |
| 2011/0127956 A1 | 6/2011 | Mitsutani |
| 2011/0169447 A1 | 7/2011 | Brown et al. |
| 2011/0309793 A1 | 12/2011 | Mitsutani |
| 2012/0025842 A1 | 2/2012 | Gibbs et al. |
| 2012/0041855 A1 | 2/2012 | Sterling et al. |
| 2012/0326502 A1 | 12/2012 | Nguyen et al. |
| 2013/0054069 A1 | 2/2013 | Komiya et al. |
| 2013/0076059 A1* | 3/2013 | Zalan ................ B60L 53/16 49/386 |
| 2013/0099740 A1 | 4/2013 | Takashima et al. |
| 2018/0105051 A1 | 4/2018 | Zheng et al. |

OTHER PUBLICATIONS

Evans, Scott, What Happens When a Rivian Runs Out of Battery Charge?, Motor Trend, Jul. 28, 2023, https://www.motortrend.com/reviews/2022-rivian-r1t-yearlong-review-update-10-running-out-of-battery/.

* cited by examiner

ELECTRIC VEHICLE HAVING MOMENTARY PUSH BUTTON BATTERY SWITCH

FIELD OF THE DISCLOSURE

The present disclosure generally relates to battery electric vehicles, and more particularly relates to an electric vehicle having a high voltage primary battery pack and a secondary low voltage battery.

BACKGROUND OF THE DISCLOSURE

Battery powered electric vehicles typically have a high voltage primary battery pack to power one or more electric motors to drive the vehicle and may include a lower voltage, e.g., 12-volt, secondary battery to power electronic modules and devices and other vehicle accessories. The high voltage primary battery pack may also charge the 12-volt secondary battery. It would be desirable to provide for an electric vehicle that provides sufficient electric energy from the 12-volt secondary battery to power control modules when the primary high voltage battery is drained.

SUMMARY OF THE DISCLOSURE

According to a first aspect of the present disclosure, an electric powered vehicle includes an electric powered motor, a high voltage primary battery pack configured to power the electric motor, a low voltage secondary battery configured to power one or more control modules, and a push button switch electrically coupled between the low voltage secondary battery and the one or more control modules, wherein the secondary battery is controlled to reserve battery energy and the push button switch is actuatable to allow the one or more control modules to be powered by the secondary battery.

Embodiments of the first aspect of the present disclosure can include any one or a combination of the following features:
  a controller for controlling the secondary battery to reserve an amount of battery energy;
  the reserved battery energy of the secondary battery is less than about fifty percent (50%);
  a battery charging port for receiving a battery charging cable connector to recharge the high voltage battery pack, wherein the push button switch is connected to the battery recharging charge port such that the push button switch is depressed when the battery charging cable connector for the charger is connected to the battery charging port;
  the low voltage secondary battery comprises at least one approximately 12-volt battery;
  the high voltage primary battery pack comprises a 400-volt or higher primary battery pack;
  the push button switch is a momentary push button switch;
  the one or more control modules control electrically powered contacts;
  the one or more control modules control a vehicle recharging latch; and
  the one or more control modules control one or more door latches.

According to a second aspect of the present disclosure, an electric powered vehicle includes an electric powered motor, a high voltage primary battery pack configured to power the electric motor, a low voltage secondary battery configured to power one or more control modules, a controller controlling the low voltage secondary battery to reserve an amount of battery energy, a momentary push button switch electrically coupled between the low voltage secondary battery and the one or more control modules, wherein the battery is controlled to reserve an amount of battery energy and the momentary push button switch allows the one or more control modules to be powered, and a battery charging port for receiving a battery charging cable connector to recharge the high voltage battery pack, wherein the momentary push button switch is connected to the battery recharging charge port such that the momentary push button switch is depressed when the battery charging cable connector for the charger is connected to the battery charging port.

Embodiments of the second aspect of the present disclosure can include any one or a combination of the following features:
  the amount of reserve battery energy is less than fifty percent (50%);
  the low voltage secondary battery comprises at least one approximately 12-volt battery;
  the high voltage primary battery pack comprises a 400-volt or higher primary battery pack;
  the one or more control modules control electrically powered contacts;
  the one or more control modules contacts for the charging port; and
  the one or more control modules control one or more door latches.

According to a third aspect of the present disclosure, a method of controlling electric powered modules in an electric vehicle is provided. The method includes supplying high voltage power from a primary battery pack to power an electric motor, supplying low voltage power from a secondary battery to power one or more control modules, detecting drainage of the high voltage power, reserving an amount of electric power in the secondary battery when the primary battery pack is drained, and reapplying the low voltage power to the one or more control modules when a push button switch is activated.

Embodiments of the third aspect of the disclosure can include any one or a combination of the following features:
  the push button switch is acclimated by a battery charging cable connector engaging a battery charging port on the vehicle; and
  the push button switch is a momentary push button switch.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
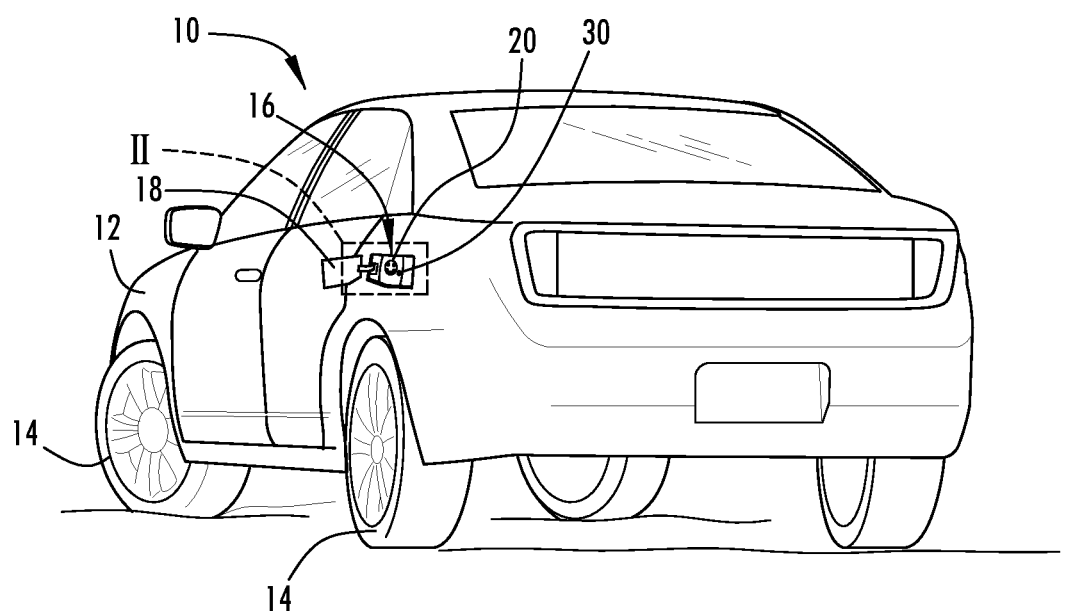
FIG. 1 is a rear side perspective view of a battery electric vehicle having a battery charging port, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to electric vehicles having primary high voltage and secondary lower voltage batteries and a push button switch to control power control modules and devices. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, an electric powered motor vehicle 10 in the form of a battery electric vehicle (BEV) is generally illustrated, according to one example. The vehicle 10 generally includes a body 12 which generally defines a cabin interior, also referred to as a passenger compartment. In the example shown, the motor vehicle 10 is a wheeled motor vehicle having a plurality of tire and wheel assemblies 14. The motor vehicle 10 is equipped with batteries and one or more electric motors, which are powered by the batteries. It should be appreciated that the electric powered motor vehicle 10 may include a fully electric powered vehicle, or may be in the form of a hybrid vehicle having an electric powered motor combined with another non-electric powered motor.

Figure 2:
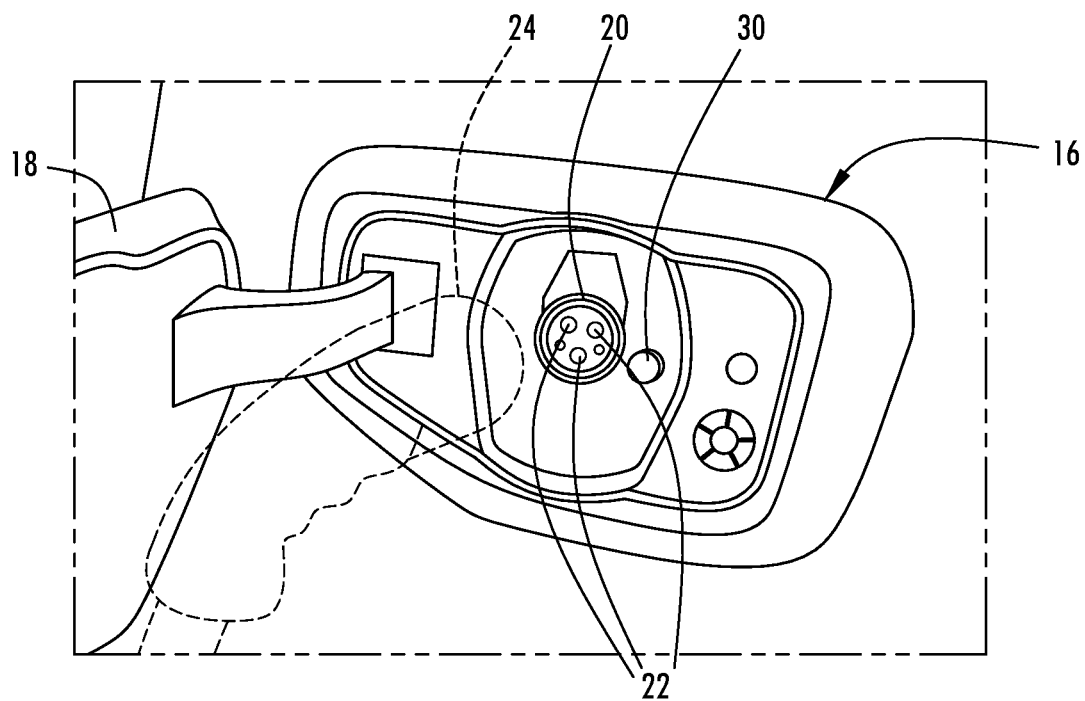
FIG. 2 is an enlarged schematic view of the electric charging port with the electric fuel door in the open position and a charger connector proximate thereto.

The electric powered motor vehicle 10 is equipped with an electric powered motor. It should be appreciated that the motor vehicle 10 may include more than one electric powered motor, such as two or more electric powered motors to power and accelerate the motor vehicle 10. The electric powered motor is powered with electric energy supplied from a high voltage primary battery pack, such as a 400-volt primary battery pack, for example. In addition, the electric powered motor vehicle 10 is further equipped with a lower voltage secondary battery, such as an approximate 12-volt battery, configured to power one or more vehicle control modules and devices including vehicle accessories. The high voltage battery pack and the lower voltage battery convert chemical energy stored therein via electrochemical reaction into electrical energy, and both batteries are rechargeable. To charge the high voltage primary battery pack, the motor vehicle 10 is equipped with an electric charging port 16 accessible on the outer side of the vehicle body 12 as seen in FIG. 2. The charging port 16 may include a charging receptacle 20 having a plurality of electrical contacts 22. The electrical contacts 22 are configured to couple with charging contacts on a charger connector associated with an electric charger 24 to supply electric energy to charge the high voltage primary battery pack. It should be appreciated that the charger connector on the electric charger 24 may matingly engage the receptacle 20 of the charging port 16 to mechanically and electronically couple with the electrical contacts 22.

The electric powered vehicle 10 is shown equipped with a momentary push button switch 30 located within the charging port 16, according to one example. The momentary push button switch 30 is configured proximate to the charger receptacle 20 in a position sufficiently close to the electrical contacts 22, such that the charger connection of the electric charger 24 when engaged to the receptacle 20, depresses the momentary push button switch 30 to close circuit the switch. The momentary push button switch 30 closes the circuit while the switch is forcibly depressed and opens the circuit when the switch is not depressed. The momentary push button switch 30 is electrically coupled to the lower voltage secondary battery and a plurality of control modules and devices to enable electric energy supplied by the low voltage secondary battery to be supplied to the control modules and devices once the momentary push button switch 30 has been depressed to provide the closed circuit.

The electric powered motor vehicle 10 is configured to supply high voltage electric power to operate the electric motor(s) to power the motor vehicle 10 and the high voltage 400-volt battery pack also charges the lower voltage secondary battery. When the high voltage primary battery pack is nearing depletion of stored energy, the vehicle controls may shut down the primary battery pack. This may occur when the high voltage primary battery pack is depleted of sufficient energy and the low voltage secondary battery charge has reached a predetermined energy level such as 50% of full energy. When this occurs, the electric energy supplied to the control modules and devices may be turned off to conserve electrical energy for situations that may require energy. This normally occurs after the driver has been notified and agrees to turn off the electrical power sources. In order to utilize the conserved energy available in the lower voltage secondary battery, the user may depress the momentary push button switch 30 with a finger or with the charger connectors of the electric charger 24, which causes a controller to reboot and reenergize control modules and devices such as door locks and charging contacts to supply electrical power to the control modules and devices, thereby enabling the vehicle 10 to further operate to allow passengers to unlock and open doors and to allow charging contacts to move into position to charge the high voltage primary battery pack.

Figure 3:
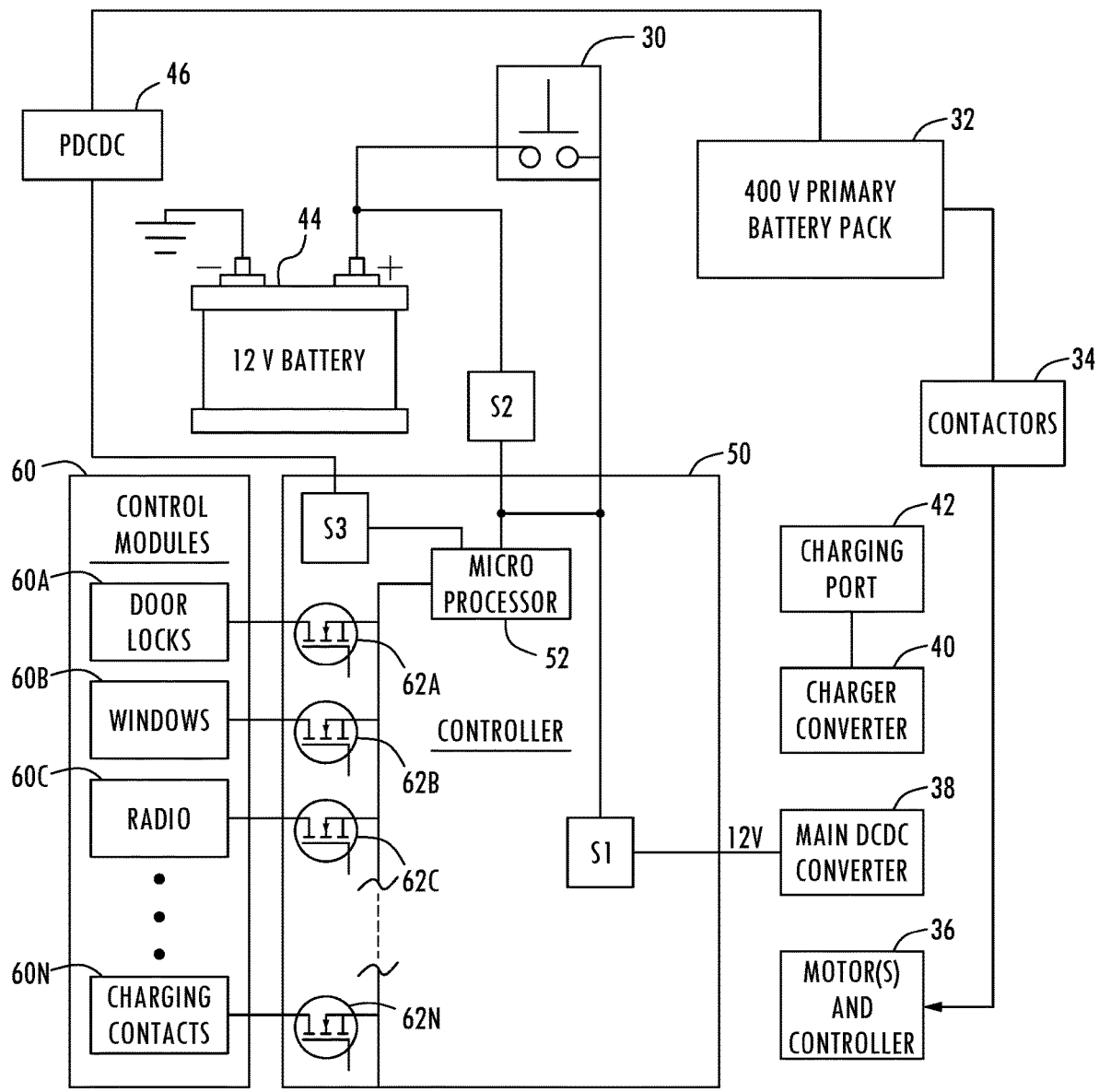
FIG. 3 is a block diagram of the vehicle illustrating the batteries, controls, and a push button switch, according to one embodiment.

Referring to FIG. 3, the electric powered motor vehicle 10 is further illustrated with the high voltage primary battery pack 32 providing a 400-volt electrical potential output to contactors 34. The contactors 34 isolate the 400-volt primary battery pack 32 from a number of electrical devices. The contactors 34, in turn, are coupled to one or more electric motors and controllers 36 which may be used to power the motor vehicle 10. In addition, the 400-volt electrical potential output is supplied through the contactors 34 to a main direct current-to-direct current (DCDC) converter 38 which converts the 400-volt electric potential to approximately 12-volt electric potential. The approximately 12-volt electrical potential is made available through a first switch S1 and a second switch S2 when closed to recharge the 12-volt battery 44 and to operate or to power a controller 50 which is shown having a microprocessor 52. The controller 50 having microprocessor 52 controls various transistors 62A through 62M which in turn controls various control modules and devices 60. The control modules and devices 60 may include vehicle door locks 60A, windows 60B, radios 60C, and charging contacts 60N, for example, in addition to other electrically powered devices and controls. The control modules may include control circuitry and electrically powered actuators for controlling and actuating devices.

The 400-volt primary battery pack 32 is also coupled to a protected DCDC converter 46, which in turn supplies the approximate 12-volt electrical potential to the microprocessor 52 in controller 50 via a third switch S3. The low voltage secondary battery 44 supplies the approximate 12-volt electric voltage potential to the microprocessor 52 via a second switch S2. Under normal vehicle operation, when the lower voltage secondary battery 44 has sufficient electrical energy or battery charge, the low voltage secondary battery 44 powers the controller 50, which in turn controls and powers the various control modules and devices 60.

The momentary push button switch 30 is shown coupled is series between the low voltage secondary battery 44 and the microprocessor 52 in the controller 50. As such, when the momentary push button switch 30 is depressed, the contacts close to allow electric current generated by the energy stored within the low voltage secondary battery 44 to be supplied to the controller 50 to electrically power the various control modules and devices 60. It should be appreciated that the momentary push button switch 30 need only be depressed for a minimal period of time, such as a few seconds, to cause the microprocessor 52 to reboot and once energized to turn on switch S2 to provide continued electrical power to power the control modules and devices 60 which may occur with the use of a relay.

Accordingly, when there is insufficient battery charge or energy detected in the high voltage primary battery pack 32 and the lower voltage secondary battery 44 is below a low charge amount, such as 50% of a full battery charge, for example, the motor vehicle 10 may query the driver of the motor vehicle 10 to determine if the vehicle power may be shut down to conserve electric power. The low charge amount may be 25% of a full charge, 10% of a full charge, or 5% of a full charge, according to other examples. If the driver of the motor vehicle 10 agrees to shut down power to the motor vehicle 10, switches S1 and S2 may be open circuited to shut off the supply of electrical power from both the high voltage primary battery pack 32 and the lower voltage secondary battery 44. Once this occurs, the control modules and devices and the motor vehicle motors receive no more power and become inoperable. The energy reserved within the lower voltage secondary battery 44 is still made available upon depressing the momentary push button switch 30, which may occur by a user depressing the push button switch 30 or an electric charger engaging and depressing the momentary push button switch 30. Sufficient force applied for the momentary switch 30 for a short period of time, such as less than a few seconds, will close circuit the switch 30 and cause the microprocessor 52 to be powered to reboot which in turn will close circuit switch S2 to allow power from the 12-volt battery 44 to be supplied to the controller 50 and the control modules and devices 60. This may enable a user of the motor vehicle 10 to unlock and open the doors, open the windows, and position the charging contacts for charging the vehicle batteries with the electric charger to a charging position. With the charging contacts in the charging position and the electric charger coupled to the charging ports, the high voltage primary battery pack may be recharged. Once the high voltage primary battery pack is charged, the high voltage primary battery pack 32 may in turn charge the lower voltage secondary battery 44.

Figure 4:
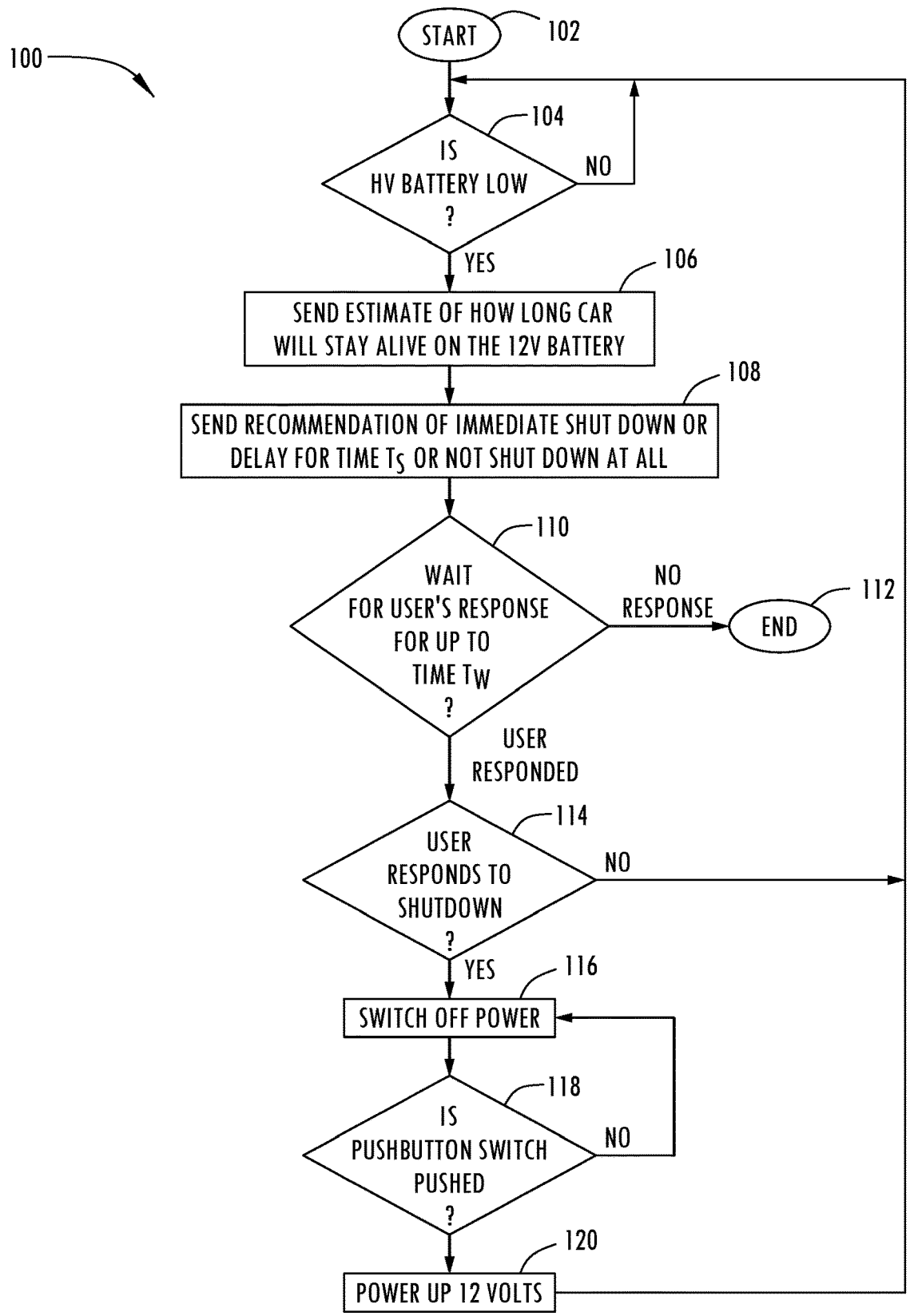
FIG. 4 is a flow diagram illustrating a method of controlling the electric power supply with the push button switch.

Referring to FIG. 4, a method of controlling the electric power to the motor vehicle 10 with the push button switch 30 is illustrated. Method 100 begins at step 102 and proceeds to step 104 to determine if the high voltage primary battery pack is low on electric energy or power and, if not, returns to step 102. If the high voltage primary battery pack is low on power, method 100 proceeds to step 106 to send an estimate of how long the vehicle is expected to stay alive or operating on the low voltage secondary battery. Next, at step 108, method 100 will send a recommendation to immediately shut down or delay for a time $T_S$ or not to shut down the electric power at all. Next, at decision step 110, method 100 will wait for a user's response for up to the time $T_W$. If there is no response, method 100 ends at step 112. If the user responds, decision step 114 determines if the user responds to shut down the electric power and, if not, returns to step 104. If the user responds to shut down the electric power, method 100 proceeds to step 116 to switch off the power supplied from the battery packs. Next, at decision step 118, method 100 determines if the push button switch has been pushed and, if so, powers up the controller and the control modules and devices with the approximate 12-volt low voltage secondary battery.

Accordingly, the electric motor vehicle 10 advantageously employs a push button switch 30 electrically coupled between the low voltage secondary battery and one or more electric powered modules and devices such that a reserve amount of electric power within the lower voltage secondary battery may be kept and utilized when needed. This enables a user to operate certain control modules and devices on the motor vehicle 10 when the battery energy is low, without completely depleting all the electric power available from the battery.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An electric powered vehicle comprising:
an electric powered motor;
one or more control modules;
a high voltage primary battery pack configured to power the electric motor;
a low voltage secondary battery configured to power the one or more control modules;
a switch coupled in a first circuit path between the low voltage secondary battery and the one or more control modules;
a controller configured to control the switch to open circuit the first circuit path to reserve battery energy in the low voltage secondary battery when the battery energy is less than a threshold; and
a push button switch electrically coupled in a second circuit path between the low voltage secondary battery and the one or more control modules, wherein the push button switch is actuatable to allow the one or more control modules to be powered by the low voltage secondary battery.

2. The electric powered vehicle of claim 1, wherein the reserved battery energy is less than about fifty percent (50%).

3. The electric powered vehicle of claim 1, further comprising a battery charging port for receiving a battery charging cable connector to recharge the high voltage battery pack, wherein the push button switch is connected to the battery recharging charge port such that the push button switch is depressed when the battery charging cable connector for the charger is connected to the battery charging port.

4. The electric powered vehicle of claim 1, wherein the low voltage secondary battery comprises at least one approximately 12-volt battery.

5. The electric powered vehicle of claim 4, wherein the high voltage primary battery pack comprises a 400-volt or higher primary battery pack.

6. The electric powered vehicle of claim 1, wherein the push button switch is a momentary push button switch.

7. The electric powered vehicle of claim 1, wherein the one or more control modules control electrically powered contacts.

8. The electric powered vehicle of claim 7, wherein the one or more control modules control a vehicle recharging latch.

9. The electric powered vehicle of claim 1, wherein the one or more control modules control one or more door latches.

10. An electric powered vehicle comprising:
an electric powered motor;
one or more control modules;
a high voltage primary battery pack configured to power the electric motor;
a low voltage secondary battery configured to power the one or more control modules;
a switch coupled in a first circuit path between the low voltage secondary battery and the one or more control modules;
a controller configured to control the switch to open circuit the first circuit path to reserve battery energy in the low voltage secondary battery when the battery energy is less than a threshold;
a momentary push button switch electrically coupled in a second circuit path between the low voltage secondary battery and the one or more control modules, wherein the momentary push button switch is actuatable to allow the one or more control modules to be powered by the low voltage secondary battery; and
a battery charging port for receiving a battery charging cable connector to recharge the high voltage battery pack, wherein the momentary push button switch is connected to the battery recharging charge port such that the momentary push button switch is depressed when the battery charging cable connector for the charger is connected to the battery charging port.

11. The electric powered vehicle of claim 10, wherein the amount of reserve battery energy is less than fifty percent (50%).

12. The electric powered vehicle of claim 10, wherein the low voltage secondary battery comprises at least one approximately 12-volt battery.

13. The electric powered vehicle of claim 12, wherein the high voltage primary battery pack comprises a 400-volt or higher primary battery pack.

14. The electric powered vehicle of claim 10, wherein the one or more control modules control electrically powered contacts.

15. The electric powered vehicle of claim 14, wherein the one or more control modules contacts for the charging port.

16. The electric powered vehicle of claim 10, wherein the one or more control modules control one or more door latches.

17. A method of controlling electric powered modules in an electric vehicle, the method comprising:
supplying high voltage power from a primary battery pack to power an electric motor;
supplying low voltage power from a secondary battery to power one or more control modules;
detecting drainage of the high voltage power;
reserving an amount of electric power in the secondary battery when the primary battery pack is substantially drained;
detecting when the amount of electric power in the secondary battery drops below a threshold;
open circuiting a first circuit path coupled between the secondary battery and the one or more control modules when the amount of electric power in the secondary battery is below the threshold, wherein the open circuit is provided by a switch controlled by a controller; and
reapplying the low voltage power to the one or more control modules through a second circuit path between the secondary battery and the one or more control modules when a push button switch is activated.

18. The method of claim 17, wherein the push button switch is acclimated by a battery charging cable connector engaging a battery charging port on the vehicle.

19. The method of claim 17, wherein the push button switch is a momentary push button switch.

* * * * *